United States Patent
Papapanagiotou et al.

(10) Patent No.: US 11,789,926 B2
(45) Date of Patent: Oct. 17, 2023

(54) TECHNIQUES FOR PERFORMING DATA RECONCILIATION IN DISTRIBUTED DATA STORE SYSTEMS

(71) Applicant: NETFLIX, INC., Los Gatos, CA (US)

(72) Inventors: Ioannis Papapanagiotou, Campbell, CA (US); Shailesh Birari, Campbell, CA (US); Jason Cacciatore, Los Gatos, CA (US); Minh Do, San Jose, CA (US); Christos Kalantzis, San Jose, CA (US)

(73) Assignee: NETFLIX, INC., Los Gatos, CA (US)

(*) Notice: Subject to any disclaimer, the term of this patent is extended or adjusted under 35 U.S.C. 154(b) by 1000 days.

(21) Appl. No.: 14/987,649

(22) Filed: Jan. 4, 2016

(65) Prior Publication Data
US 2017/0193031 A1 Jul. 6, 2017

(51) Int. Cl.
*G06F 16/23* (2019.01)
*G06F 16/11* (2019.01)
(Continued)

(52) U.S. Cl.
CPC ...... *G06F 16/2365* (2019.01); *G06F 11/1451* (2013.01); *G06F 16/128* (2019.01);
(Continued)

(58) Field of Classification Search
CPC ......... G06F 17/30371; G06F 17/30174; G06F 11/1451; G06F 17/30; G06F 16/2365;
(Continued)

(56) References Cited

U.S. PATENT DOCUMENTS

| 5,600,834 | A | * | 2/1997 | Howard | G06F 16/178 |
| | | | | | 707/610 |
| 2007/0106771 | A1 | * | 5/2007 | Lucash | H04L 67/1095 |
| | | | | | 709/223 |
| 2015/0261600 | A1 | * | 9/2015 | Iturralde | H04N 21/236 |
| | | | | | 714/747 |

FOREIGN PATENT DOCUMENTS

| CN | 102054035 A | 5/2011 | |
| CN | 102054035 B | * 5/2011 | ............. G06F 16/23 |

(Continued)

OTHER PUBLICATIONS

International Search Report and Written Opinion of the International Searching Authority, Application No. PCT/US2017/012214, dated Apr. 5, 2017, 14 pages.
(Continued)

*Primary Examiner* — Hosain A Alam
*Assistant Examiner* — Tracy M McGhee
(74) *Attorney, Agent, or Firm* — Artegis Law Group, LLP

(57) ABSTRACT

In one embodiment, a data reconciliation engine works with data store nodes included in a distributed data store system to ensure consistency between the data store nodes. In operation, the data reconciliation receives a different data snapshot from each of the data store nodes. In response, the data reconciliation engine generates one or more recommendations designed to resolve inconsistencies between the data snapshots. The data reconciliation engine then transmits each recommendation to a different data store node. Because the data reconciliation engine performs many of the resource-intensive operations included in the data reconciliation process, the resources of the data store nodes may focus primarily on processing client requests instead of performing data reconciliation operations. Consequently, unlike conventional data store node based reconciliation applications, the data reconciliation engine may process (Continued)

large volumes of data without unacceptably increasing the time required for the distributed data store system to respond to client requests.

20 Claims, 5 Drawing Sheets

(51) Int. Cl.
*G06F 16/174* (2019.01)
*G06F 16/178* (2019.01)
*G06F 11/14* (2006.01)
*H04L 9/40* (2022.01)

(52) U.S. Cl.
CPC ........ *G06F 16/178* (2019.01); *G06F 16/1744* (2019.01); *H04L 63/0428* (2013.01); *G06F 2201/835* (2013.01); *G06F 2201/84* (2013.01)

(58) Field of Classification Search
CPC .. G06F 16/1744; G06F 16/128; G06F 16/178; H04L 63/0428

USPC ................................................. 707/638, 636
See application file for complete search history.

(56) References Cited

FOREIGN PATENT DOCUMENTS

| CN | 102054035 B | * | 1/2013 |
| CN | 103870602 A | | 6/2014 |

OTHER PUBLICATIONS

Wang et al., "The introduction of distributed storage system and exploration of data consistency method", Technological Development of Enterprise, DOI: 10.14165/j .cnki.hunansci.2012.22.021, vol. 31, No. 22, Aug. 2012, pp. 18-20.

* cited by examiner

TECHNIQUES FOR PERFORMING DATA RECONCILIATION IN DISTRIBUTED DATA STORE SYSTEMS

BACKGROUND OF THE INVENTION

Field of the Invention

Embodiments of the present invention relate generally to computer science and, more specifically, to techniques for performing data reconciliation in distributed data store systems.

Description of the Related Art

Many distributed data store systems store data for clients in clusters of nodes that are located in multiple geographic regions. The nodes within a cluster are typically interconnected computers or virtual machines, where each computer manages a storage device and supply services via a client-server architecture. Generally, in a client-server architecture, clients request services and, in response, servers provide services. More specifically, when a client submits a read or write request to the distributed data store system, a node included in a cluster that is assigned to that client receives and processes the request.

As part of responding to a write request from a given client, a receiving node in a given cluster typically stores the data in an associated storage device and then broadcasts the data to the other nodes in the same given cluster as well as to nodes in other clusters. Upon receiving the broadcast data, the receiving nodes store the data in their respective associated storage devices. In this fashion, data is stored redundantly within the distributed data store system. Consequently, if a particular node or cluster within the distributed data store system becomes unavailable, then the requests received from clients within the system may be processed by other nodes or clusters within the system without any interruption of the various services provided by the distributed data store system. For example, if a data store cluster in California were to become unavailable (e.g., experiences a power outage, etc.), then a data store cluster in New York could still respond to requests from clients located in California until the data store cluster in California were to become available once again.

In operation, data store clusters and nodes oftentimes experience interruptions in communications and/or operation. Further, the time required for broadcasted data to propagate to one node within the system may differ from the time required for broadcasted data to propagate to another node within the system. For these reasons, among others, the data stored in the distributed data store system can become inconsistent. In one approach to resolving such inconsistencies in the distributed data store system, the nodes are configured to exchange data, compare the data, and then reconcile any inconsistencies among the data. By periodically synchronizing the data via this "data reconciliation" process, the different nodes can maintain replicated data consistently across the distributed data store system, One drawback to the above approach to data reconciliation is that overall performance may be unacceptably low for larger volumes of data. More specifically, as the volume of data increases, the amount of node resources (e.g., memory bandwidth, memory, processing capability, etc.) required to perform data reconciliation operations also increases. Node resources that are consumed by the data reconciliation process are unavailable to process client requests. Thus, as the volume of data increases, the performance of the distributed storage system can decrease substantially, and the time required for the distributed data store system to respond to client requests can increase to unacceptable levels.

As the foregoing illustrates, what is needed in the art are more effective techniques for performing data reconciliation in distributed data store systems.

SUMMARY OF THE INVENTION

One embodiment of the present invention sets forth a computer-implemented method for generating recommendations when performing data reconciliation. The method includes comparing a first timestamp associated with a first value that is received from a first data store node to a second timestamp associated with a second value that is received from a second data store node; determining that the second timestamp is more recent than the first timestamp; and transmitting a first recommendation that includes the second value to the first node.

One advantage of the disclosed techniques for data reconciliation is that many resource-intensive data reconciliation operations may be offloaded from the data store nodes that respond to requests from clients. More specifically, a system data reconciliation engine may be configured to identify inconsistencies in the client data stored in the data store nodes across a distributed data store system and then provide recommendations designed to resolve the identified inconsistencies. Because the data store nodes may dedicate resources to processing request from clients instead of performing such offloaded data reconciliation operations, the data store nodes may respond to client requests in an acceptable amount of time irrespective of the volume of client data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
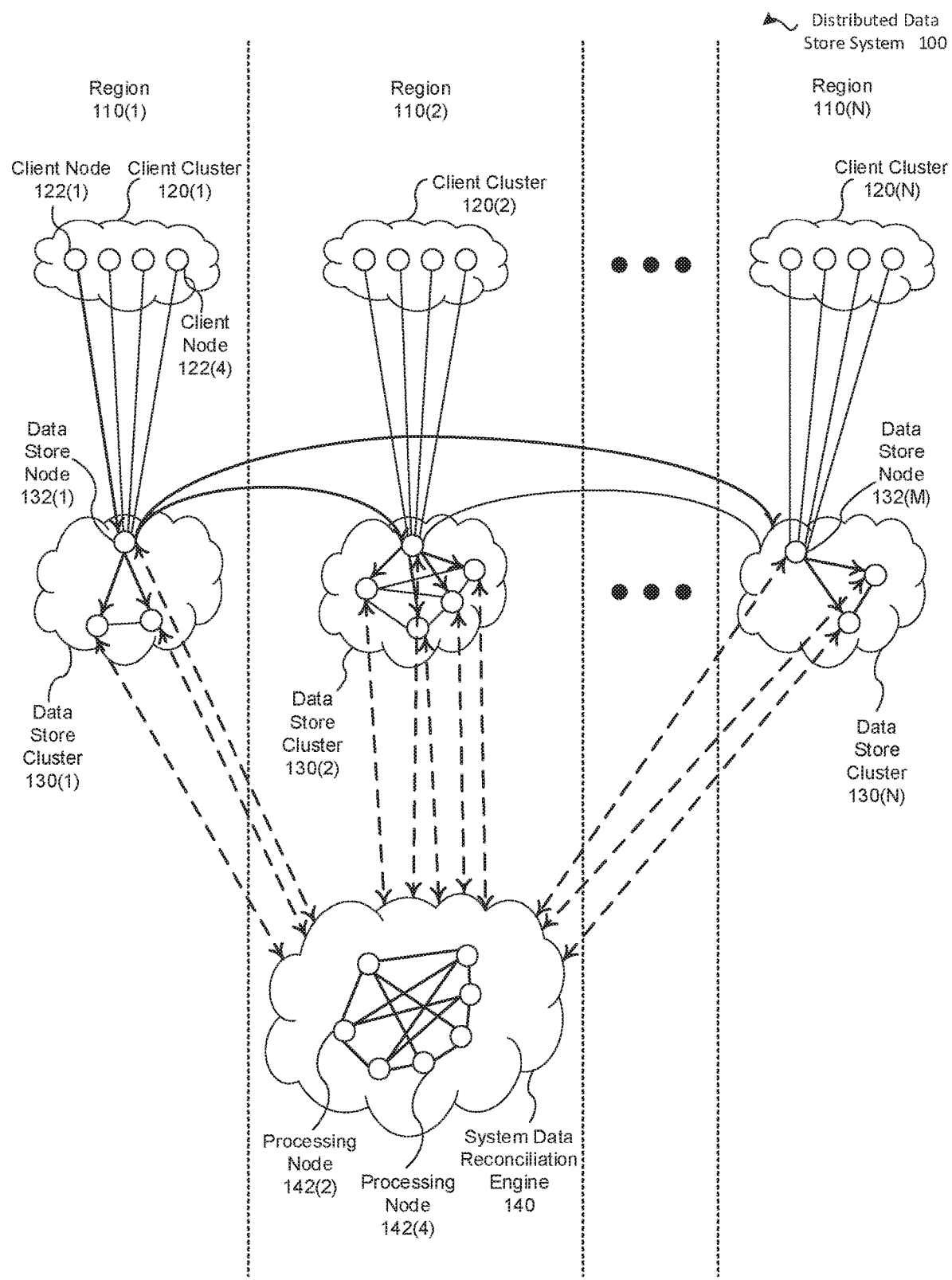
FIG. 1 is a conceptual illustration of a distributed data store system configured to implement one or more aspects of the present invention.

FIG. 1 is a conceptual illustration of a distributed data store system 100 configured to implement one or more aspects of the present invention. As shown, the distributed data store system 100 includes any number of regions 110. Each of the regions 110 typically represents a different geographical location that is serviced by the distributed data store system 100. As also shown, the distributed data store system 100 includes, without limitation, client clusters 120, data store clusters 130, and a system data reconciliation engine 140. Each of the client clusters 120, the data store clusters 130, and the system data reconciliation engine 140 may be located in any of the regions 110.

The client clusters 120 and the data store clusters 130 are configured in a client-server architecture. In the client-server architecture, client nodes 122 included in the client clusters 120 generate data store requests and data store nodes 132 included in the data store clusters 130 respond to the data store requests. The client nodes 122 may include any type of client device that is capable of interacting with the data store clusters 140. Such client devices include, without limitation, desktop computers, laptops, smartphones, smart televisions, game consoles, tablets, television-connected devices, handheld devices streaming entertainment devices, and the like. The data store requests typically include requests to store client data and requests to read client data.

As shown, each of the client nodes 122 included in a particular client cluster 120 is associated with one of the data store nodes 132 included in an associated data store cluster 130 that is located in the same region 110. In alternate embodiments, the client clusters 120, the data store clusters 130, and the data store nodes 132 may be associated in any technically feasible fashion. For example, in some embodiments each of the client nodes 122 may be associated with a different data store node 132.

Upon receiving a request to store client data, the associated data store node 132 in the associated data store cluster 130 stores the client data in a storage device managed by the data store node 132. The data store node 132 may be any type of processing device that manages client data via an associated storage device. After storing the client data in the associated storage device, the data store node 132 broadcasts the client data to any number of the data store nodes 132 included in the associated data store cluster 130 as well as any number of the data store nodes 132 included in any number of the other data store clusters 130. Such a process stores the client data repeatedly within the distributed data store system 100, thereby ensuring availability of the client data irrespective of the individual availability of each of the data store nodes 132 and the data store clusters 130.

More precisely, if the data store node 132 that is associated with a particular client cluster 120 becomes unavailable (e.g., experiences a power failure, connectivity loss, etc.), then the distributed data store system 100 associates the client cluster 120 with another data store node 132 that is available. In alternate embodiments, the data store nodes 132 may implement any distributed data store techniques as known in the art for storing client data in a redundant fashion across the data store nodes 132 and the data store clusters 130 and, subsequently, accessing the stored client data.

Notably, the time required for the broadcasted data to propagate to one data store node 132 within the distributed data store system 100 may differ from the time required for the broadcasted data to propagate to another data store node 132 within the distributed data store system 100. Further, because the data store clusters 130 and the data store nodes 132 oftentimes experience interruptions in communications and/or operation, one or more of the data store nodes 132 may not receive the broadcasted data. For these reasons, among others, different data store nodes 132 may provide different values in response to comparable requests for client data at any given time.

For example, suppose that the data store node 132(1) were to receive a new value for client data that is currently stored in the distributed data store system 100. The data store node 132(1) could store the new value for the client data in the associated storage device and broadcast the new value to the data store node 132(M). If the data store node 132(M) were to experience a loss in connectivity, then the storage device associated with the data store node 132(M) could continue to store the older value for the client data. In response to a subsequent data store request to read the client data, the data store node 132(M) could return the older value.

In conventional approaches to resolving inconsistencies in distributed data store systems, the data store nodes exchange data, compare the data, and then reconcile any inconsistencies. By periodically synchronizing the data via this "data reconciliation" process, the different data store nodes can maintain replicated data consistently across the distributed data store system. However, performing data reconciliation operations in such a fashion relies on the resources (memory bandwidth, memory, processing capability) included in the data store nodes. Further, as the volume of client data increases, the amount of resources required to perform data reconciliation operations also increases. The resources included in the data store nodes that are consumed by the data reconciliation process are unavailable to process data store requests received from the clients. Consequently, as the volume of client data increases, the time required for the conventional distributed storage systems to respond to data store requests received from the clients can increase to unacceptable levels.

Figure 2:
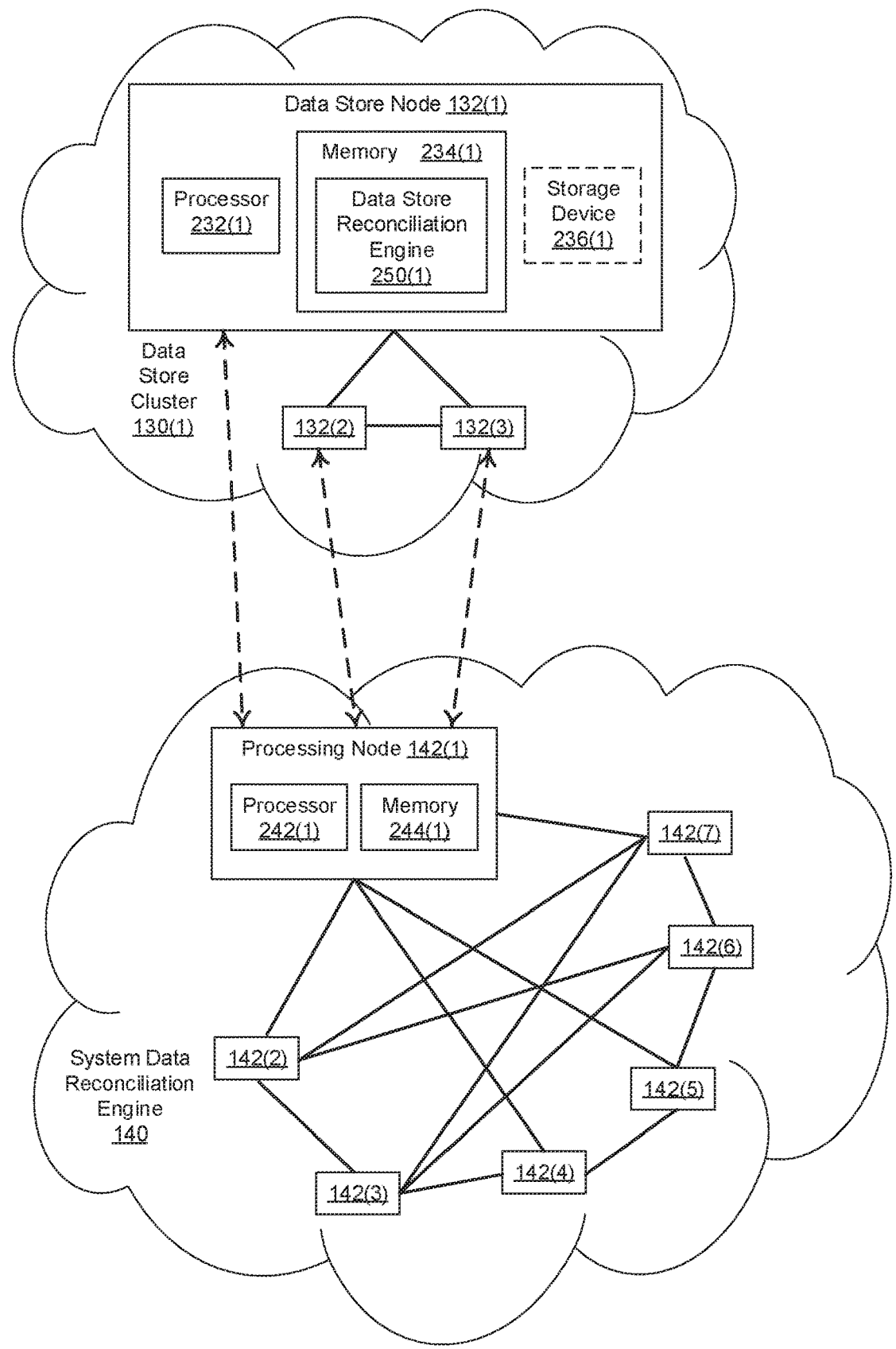
FIG. 2 is a more detailed illustration of the data store cluster and the system data reconciliation engine of FIG. 1, according to various embodiments of the present invention.

For this reason, the distributed data store system 100 includes the system data reconciliation engine 140. The system data reconciliation engine 140 includes any number of processing nodes 142 that are configured to offload resource-intensive data reconciliation operations from the data store nodes 132. The system data reconciliation engine 140 may include any number of the processing nodes 142 and may configure the processing nodes 142 in any technically feasible fashion to efficiently perform data reconciliation operations. Typically, the system data reconciliation engine 140 configures the processing nodes 142 to operate concurrently to minimize the time required to perform the data reconciliation process. The system data reconciliation engine 140 and the processing nodes 142 may be interconnected in any technically feasible fashion and exchange data using any type of communication protocol, FIG. 2 is a more detailed illustration of the data store cluster 130(1) and the system data reconciliation engine 140 of FIG. 1, according to various embodiments of the present invention. For explanatory purposes, FIG. 2 depicts the single data store cluster 130(1) that includes the three data store nodes 132(1), 132(2), and 133(3). In alternate embodiments, the distributed data store system 100 may include any number of data store clusters 130 and each data store cluster 130 may include any number of data store nodes 132. The data store clusters 130 and the data store nodes 132 may be interconnected in any technically feasible fashion, As shown, each of the data store nodes 132 includes, without limitation, a processor 232 and a memory 234. Further, each of the data store nodes 132 manages a storage device 236. In alternate embodiments, each of the data store nodes 132 may be configured with any number (including zero) of processors 232 and memories 234, and the configuration of the data store nodes 132 may vary. In operation, the processor 232(1) is the master processor of the data store node 132(1), controlling and coordinating operations of other components included in the data store node 132(1) and the storage device 236(1). The memory 234(1) stores content, such as software applications and audio-visual data, for use by the processor 232(1) of the data store node 132(1). In general, each of the data store nodes 132 implements a server that manages the storage device 236 in response to data store requests received from client nodes 122.

During operation of the distributed data store system 100, inconsistencies may arise between the data stored in the storage devices 236 associated with different data store nodes 132. To enable the distributed data store system 100 to resolve such discrepancies, for each of the data store nodes 132, the processor 232 executes a data store reconciliation engine 250 that is stored in the corresponding memory 234. As described in detail in FIG. 3, the data store reconciliation engines 250 executing on the data store nodes 132 and the system data reconciliation engine 140 work together to resolve inconsistencies between the data stored in the storage devices 236.

As shown, the system data reconciliation engine 140 includes the processing nodes 142(1) through 142(7). In alternate embodiments, the system data reconciliation engine 140 may include any number of processing nodes 132, and the processing nodes 132 may be interconnected in any technically feasible fashion. Each of the processing nodes 142 includes, without limitation, a processor 242 and a memory 244. In alternate embodiments, each of the processing nodes 142 may be configured with any number of processors 242 and memories 244, and the configuration of the processing nodes 142 may vary.

The processor 242(1) is the master processor of the processing node 142(1), performing computations and controlling and coordinating operations of other components included in the processing node 142(1). The memory 244(1) stores content, such as data, for use by the processor 242(1) of the processing node 142(1). In general, the system data reconciliation engine 140 may execute any number of execution threads on any number of the processing nodes 142 in any combination. Further, the system data reconciliation engine 140 may configure the processing nodes 142 to execute any number of the threads sequentially and/or concurrently in any combination.

Performing Data Reconciliation

Figure 3:
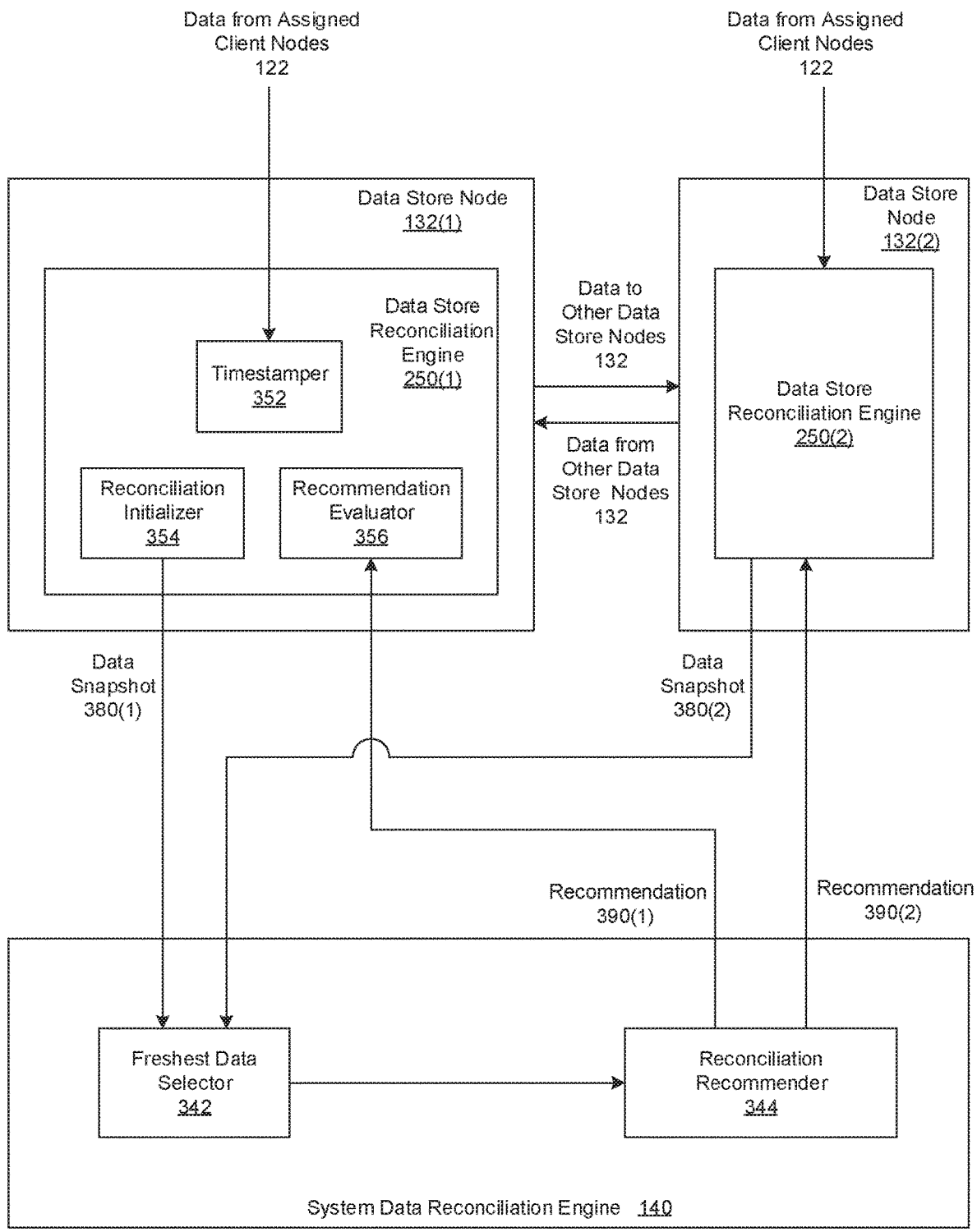
FIG. 3 is a more detailed illustration of the data store reconciliation engines and the system data reconciliation engine of FIG. 2, according to various embodiments of the present invention.

FIG. 3 is a more detailed illustration of the data store reconciliation engines 250 and the system data reconciliation engine 140 of FIG. 2, according to various embodiments of the present invention. For explanatory purposes, FIG. 3 depicts the data store reconciliation engine 250(1) that executes on the data store node 132(1), the data store reconciliation engine 250(2) that executes on the data store node 132(2), and the system data reconciliation engine 140 that executes on the processing nodes 142. In alternate embodiments, any number of the data store reconciliation engines 250 may execute on any number of the data store nodes 132. Further, the system data reconciliation engine 140 may launch execution threads on any number of the processing nodes 142.

As shown for the data store reconciliation engine 250(1), each of the data store reconciliation engines 250 includes, without limitation, a timestamper 352, a reconciliation initializer 354, and a recommendation evaluator 356. In operation, each of the data store reconciliation engines 250 receives data from the client nodes 122 that are associated with the data store reconciliation engine 250. Upon receiving such "client data," the timestamper 352 timestamps the client data. The timestamper 352 may generate the timestamp in any technically feasible fashion. For example, in some embodiments the timestamper 352 may request a current time from a centralized clock service and then set the timestamp to match the current time. In other embodiments, the timestamper 352 may implement a vector clock algorithm.

The timestamper 352 may associate the timestamp with the client data in any technically feasible fashion and at any granularity that is consistent with the data storage paradigm implemented in the distributed data storage system 100. For example, in some embodiments, the distributed data store system 100 may implement a key-value data storage paradigm in which each key-value object includes three elements: a unique key, a value, and a timestamp. In such embodiments, the data store node 132 stores and retrieves timestamps and values via the keys.

Notably, the data store nodes 132 may be configured to implement any technically feasible replication scheme across the data store clusters 130 to ensure the client data is stored in multiple locations. In particular, as part of storing client data, the data store node 132 typically stores the timestamps and values in the associated storage device 236 and then broadcasts the client data for redundant storage purposes. The data store node 132 may broadcast the client data to any number of other data store nodes 132 that are located in any number of the data store clusters 130 according to the replication scheme implemented within the distributed data store system 100.

As previously described herein, as the distributed data store system 100 operates, the client data stored in the storage devices 236 may become inconsistent. For this reason, the reconciliation initializer 354 periodically initiates a data reconciliation process that identifies and resolves any inconsistencies. The reconciliation initializer 354 may determine when to start a new data reconciliation process in any technically feasible fashion. For example, in some embodiments, the reconciliation initializer 354 may be configured to start a new data reconciliation process in response to an external trigger. In other embodiments, the reconciliation initializer 354 may be configured to start a new data reconciliation process based on an internal trigger that occurs a predetermined time or after a predetermined time interval. In general, the reconciliation initializers 354 executing on all the data store nodes 132 are configured to begin a new data reconciliation process together.

To start a new data reconciliation process, each of the reconciliation initializers 354 generates a data snapshot 380 that includes the timestamped client data that is stored in the associated storage device 236. Subsequently, each of the reconciliation initializers 354 transmits the associated data snapshot 380 to the system data reconciliation engine 140. In various embodiments, the reconciliation initializers 354 may implement any number of techniques designed to decrease the size of the data snapshot 380, decrease the likelihood of communication errors, ensure the privacy of the client data, and so forth.

For example, in some embodiments, the reconciliation initializer 354 compacts the timestamped client data, divides the compacted data into multiple chunks, compresses each chunk, and encrypts each compressed chunk. More specifically, the reconciliation initializer 354 performs compaction operations that remove client data that is not relevant to the reconciliation process to create compacted data. Such irrelevant client data may include historical data that is stored in the storage device 326 and the like.

Because, among other things, communications glitches may disrupt data transfers from the data store node 132 to the system data reconciliation engine 140, the reconciliation initializer 354 may divide the compacted data into multiple chunks. If any of the chunks are not successfully transferred to the system data reconciliation engine 140, then the reconciliation initializer 354 may retransmit only the impacted chunks, thereby minimizing the amount of communication bandwidth required to retransfer the compacted data. Further, in some embodiments, the reconciliation initializer 354 may perform chunking operations to throttle the data reconciliation process. For example, in some embodiments, if the volume of traffic that the data store node 132(1) receives from the client nodes 122 is relatively high, then the reconciliation initializer 354 may perform chunking operations to reduce the volume of traffic from the data store node 132(1) to the system data reconciliation engine 150. Such chunking may reduce the likelihood of straining the network interface of the data store node 132(1) and optimize the response time to data store requests received from the client nodes 122.

To further optimize the communication bandwidth, the reconciliation initializer 354 may compress each of the chunks. The system data reconciliation engine 140 may compress each of the chunks in any technically feasible fashion. Finally, to provide confidentiality, the reconciliation initializer 354 may encrypt each of the compressed chunks. The reconciliation initializer 354 may implement any number and type of encryption algorithms, such as cryptographic algorithms and so forth. Consequently, irrespective of the security of the communication path linking the data store nodes 132 and the system data reconciliation engine 140, the reconciliation initializer 354 maintains the privacy of the client data.

In alternate embodiments, the reconciliation initializer 354 may perform any number of preprocessing operations on the timestamped client data in any combination. For example, in some embodiments, the reconciliation initializer 354 may compress and encrypt the timestamped client data but may not perform any compaction or chunking operations. In general, the reconciliation initializer 354 may perform any preprocessing techniques that are consistent with the system data reconciliation engine 140. For example, if the reconciliation initializer 354 implements compression and encryption algorithms, then the system data reconciliation engine 140 implements corresponding decryption and decompression algorithms.

As shown, the system data reconciliation engine 140 includes, without limitation, a freshest data selector 342 and a reconciliation recommender 344. In operation, the freshest data selector 342 receives the data snapshots 380 from the data store nodes 132. Notably, any number of the processing nodes 142 may receive any number of data snapshots 380. Further, the system data reconciliation engine 140 may configure any number of threads to execute concurrently, sequentially, or in any combination thereof, on any number of the processing nodes 142 to perform any number of operations on the data snapshots 380.

For example, in some embodiments, the processing nodes 142(0) receives all the data snapshots 380 and the system data reconciliation engine 140 configures all the processing nodes to perform operations on the data snapshots 380 concurrently. In this fashion, the system data reconciliation engine 140 minimizes the time required to perform the data reconciliation operations. The system data reconciliation engine 140 may partition and synchronize the data reconciliation operations between the processing nodes 142 in any technically feasible fashion. In general, the functionality included in the freshest data selector 342 and/or the reconciliation recommender 344 may be implemented via any number of threads executing on any portion of the data snapshots 380 on any number of the processing nodes 142. Further, the system data reconciliation engine 140 may configure the threads to execute concurrently, sequentially, or any combination thereof across the processing nodes 142.

Upon receiving the data snapshots 380, the freshest data selector 342 processes the data snapshots 380 to restore the timestamped client data. The freshest data selector 342 tailors the number and type restoration operations based on the format of the data snapshots 380. For example, if the data snapshots 380 are compressed and encrypted, then the freshest data selector 342 performs decryption and decompression operations on the data snapshots 380.

The freshest data selector 342 then performs comparison operations between the timestamps included in the data snapshots 380 to determine the most up-to-date data. The freshest data selector 342 may compare the timestamps in any technically feasible fashion. Based on the comparison operations, the freshest data selector 342 generates a "most recent" data that includes the most up-to-date timestamped data. Significantly, the freshest data selector 342 may perform the comparison operations and generate the most recent data at any granularity that is supported by the data snapshot 380. For example, if the distributed data store system 100 implements a key-value storage paradigm, then the freshest data selector 342 could determine the most recent value for each key based on the timestamps.

Subsequently, for each of the data snapshots 380, the reconciliation recommender 344 identifies any inconsistencies between the data snapshot 380 and the most recent data. The reconciliation recommender 344 may identify the inconsistencies in any technically feasible fashion. For example, the reconciliation recommender 344 may compare the timestamps included in the data snapshot 380 to the timestamps included in the data snapshot 380. For each of the data snapshots 380, if the reconciliation recommender 344 identifies any inconsistencies, then the reconciliation recommender 344 generates a corresponding recommendation 390.

Each of the recommendations 390 includes timestamped data that is more recent than the timestamped data included in the associated data snapshot 380. If, for a particular data snapshot 380, the reconciliation recommender 344 does not identify any inconsistencies, then the reconciliation recommender does not generate an associated recommendation 390. Significantly, each of the recommendations 390 is associated with a particular data snapshot 390, and each of the data snapshots 390 is associated with a particular data store node 132. Consequently, each of the recommendations 390 is associated with a particular data store node 132.

As the reconciliation recommender 344 generates the recommendations 390, the reconciliation recommender 344 transmits each of the recommendations 390 to the associated data store node 132. In some embodiments, the reconciliation recommender 344 may be configured to perform any number of chunking, compression, and/or encryption operations on each of the recommendations 390 prior to transmitting the recommendation 390. Further, the reconciliation recommender 344 may selectively perform such pre-transmission optimization operations based on the size of each of the recommendations 390. For example, if the size of a particular recommendation 390 exceeds a predefined threshold, then the reconciliation recommender 344 may compress and encrypt the recommendation 390. By contrast, if the size of a particular recommendation 390 does not exceed the predefined threshold, then the reconciliation recommender 344 may encrypt the recommendation 390 without compressing the recommendation 390.

Upon receiving the recommendation 390, the recommendation evaluator 356 that executes on the data store node 132 that receives the recommendation 390 determines whether to modify the data stored in the associated storage device 236. In operation, the recommendation evaluator 356 performs any number of restoration operations to restore the recommendation 390. For example, the recommendation evaluator 356 may decrypt and/or decompress the recommendation 390. Subsequently, the recommendation evaluator 356 compares the timestamps of the timestamped data included in the recommendation 390 to the timestamps of the "stored" timestamped data included in the storage device 236 managed by the data store node 132.

If the recommendation evaluator 356 determines that any of the timestamped data included in the recommendation 390 is more recent than the corresponding stored timestamped data, then the recommendation evaluator 356 updates the storage device 236. More specifically, the recommendation evaluator 356 replaces the stale timestamped data included in the storage device 236 with the timestamped data included in the recommendation 390. By contrast, if the recommendation evaluator 356 determines that any of the timestamped data included in the recommendation 390 is not more recent than the stored timestamped data, then the recommendation evaluator 356 disregards the stale timestamped data included in the recommendation 390.

The recommendation evaluator 356 may perform the comparison operations and determine whether to update the storage device 236 at any granularity that is consistent with the data storage paradigm implemented in the distributed data store system 100. For example, in some embodiments the recommendation evaluator 358 may operate at the granularity of keys. In such embodiments, the recommendation evaluator 358 could store portions of the timestamped data corresponding to specific keys and included in the recommendation 390 in the storage device 236. The recommendation evaluator 358 could disregard the remaining portions of timestamped data included in the recommendation 390.

By selectively applying the recommendation 390, the recommendation evaluator 356 ensures that any new client data that the data store node 132 receives and stores while the system data reconciliation engine 140 performs data reconciliation operations is not overwritten. During the next data reconciliation process, the new client data is synchronized across the data store nodes 132 and, together, the data store node 132 and the system data reconciliation engine 140 resolve any inconsistencies associated with the new client data.

Figure 4:
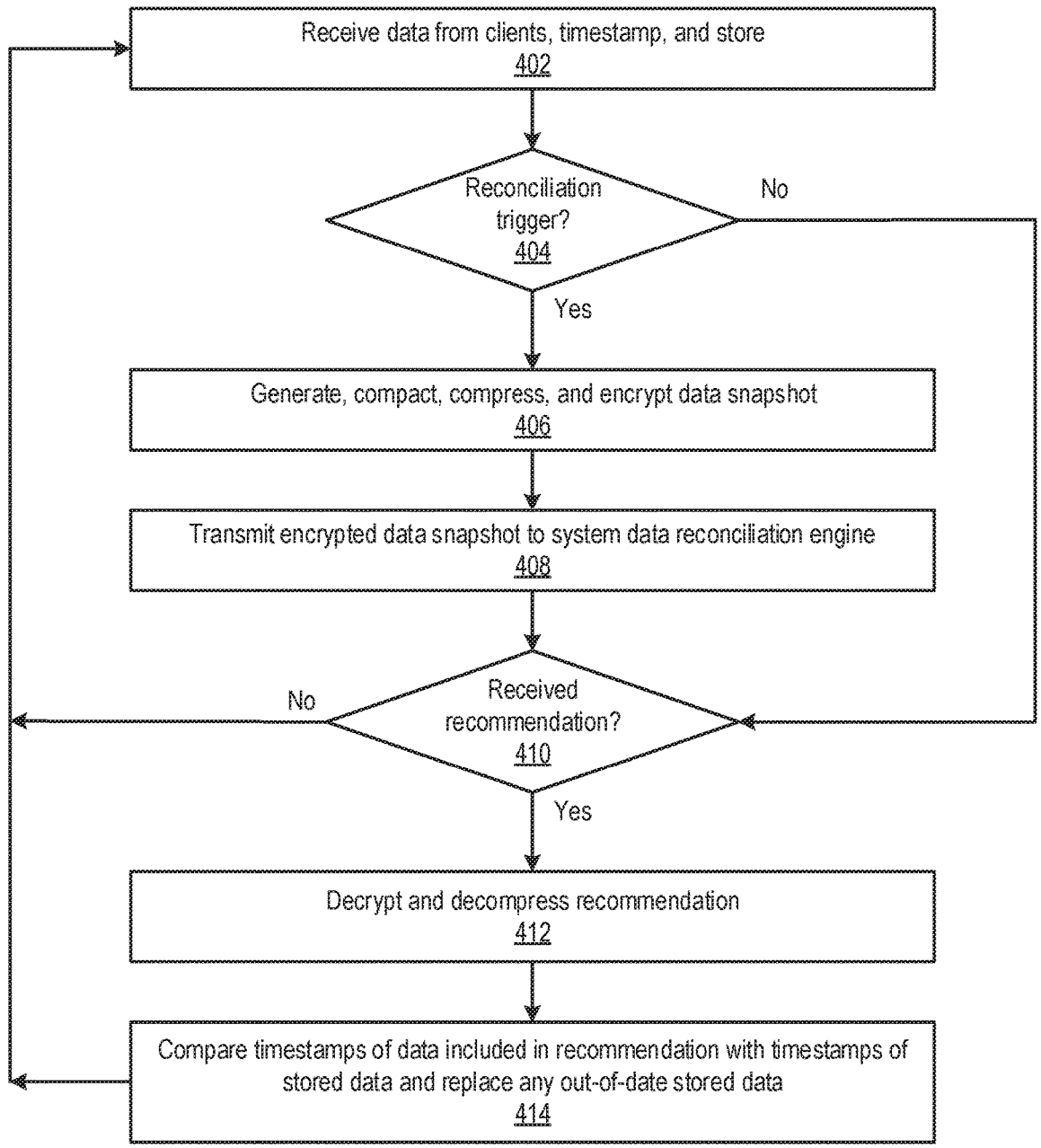
FIG. 4 is a flow diagram of method steps for performing data reconciliation for a data store node in a distributed data store system, according to various embodiments of the present invention.

FIG. 4 is a flow diagram of method steps for performing data reconciliation for a data store node in a distributed data store system, according to various embodiments of the present invention. Although the method steps are described with reference to the systems of FIGS. 1-3, persons skilled in the art will understand that any system configured to implement the method steps, in any order, falls within the scope of the present invention. For explanatory purposes, the method 400 describes the operation of the single data store node 132(1) included in the data store cluster 130(1). However, generally, all the data store nodes 132 included in the all the data store clusters 130 implement the method steps described in the method 404.

As shown, a method 400 begins at step 402, where the data store node 132(1) receives data from the client nodes 122. Upon receiving data, the data store reconciliation engine 250 that executes on the data store node 132(1) timestamps the data. The data store reconciliation engine 250 may timestamp the data in any technically feasible fashion. In some embodiments, to ensure consistency across the distributed data store system 100, the data store reconciliation engine 250 may generate the timestamp based on a centralized clock service. The data store node 132(1) then stores the timestamped data in the storage device 236(1). As part of storing the timestamped data, the data store node 132(1) may broadcast the timestamped data to other data store nodes 132 in the data store cluster 132(1) and in other data store clusters 132.

At step 404, the data store reconciliation engine 250 determines whether the data store node 132(1) has received a reconciliation trigger. The reconciliation trigger may be implemented in any technically feasible fashion. For example, in some embodiments, the reconciliation trigger may be an externally generated signal. In other embodiments, the reconciliation trigger may be an internally generated signal that is automatically asserted at a predetermined time. If, at step 404, the data store reconciliation engine 250 determines that the data store node 132(1) has not received a reconciliation trigger, then the method 400 proceeds directly to step 410.

However, if, at step 404, the data store reconciliation engine 250 determines that the data store node 132(1) has received a reconciliation trigger, then the method 400 proceeds to step 406. At step 406, the data store reconciliation engine 250 generates the data snapshot 380(1). In general, the data snapshot 380(1) includes the timestamped data that is stored in the storage device 236(1). However, to reduce the size of the data snapshot 380(1) and ensure the privacy of the client data, the data store reconciliation engine 250 may perform any number of preprocessing operation on the data snapshot 380(1). For example, in some embodiments, the data store reconciliation engine 250 may compact, compress, and encrypt the data snapshot 380(1). At step 408, the data store reconciliation engine 250 transmits the data snapshot 380(1) to the system data reconciliation engine 140.

At step 410, the data store reconciliation engine 250 determines whether the data store node 132(1) has received the recommendation 390(1) from the system data reconciliation engine 140. If, at step 410, the data store reconciliation engine 250 determines that the data store node 132(1) has not received the recommendation 390(1) from the system data reconciliation engine 140, then the method 400 returns to step 402, where the data store node 132(1) receives new data from the client nodes 122.

However, if at step 410, the data store reconciliation engine 250 determines that the data store node 132(1) has received the recommendation 390(1) from the system data reconciliation engine 140, then the method 400 proceeds to step 412. At step 412, the data store reconciliation engine 250 decrypts and decompresses the recommendation 390(1). In alternate embodiments, the recommendation 390(1) may not be encrypted and/or decompressed and the data store reconciliation engine 250 may not decrypt and/or decompress the recommendation 390(1).

At step 414, the data store reconciliation engine 250 compares the timestamps of the timestamped data included in the recommendation 390(1) to the timestamps of the timestamped data stored in the storage device 236(1). The data store reconciliation engine 250 may perform the comparisons in any technically feasible fashion and at any granularity supported by the distributed data store system 100. For example, in some embodiments, the distributed data store system 100 may implement a key-value data storage paradigm in which values are stored and retrieved via unique keys. Each key may be associated with any amount of memory and may be individually timestamped. In such a key-value implementation, the data store reconciliation engine 250 may individually compare the timestamp associated with each key in the recommendation 390(1) with the timestamp associated the corresponding key in the storage device 236(1).

If, for a particular key, the data store reconciliation engine 250 determines that the associated timestamp in the recommendation 390(1) is not more recent than the associated timestamp in the storage device 236(1), then the data store reconciliation does not update the storage device 236(1). Notably, the data store reconciliation engine 250 discards the timestamp and value associated with the key that are included in the recommendation 390(1). Such a process ensures that client data that the data store node 132(1) stores in the storage device 236(1) while the system data reconciliation engine 140 performs data reconciliation operations is not erroneously overwritten. Any inconsistencies across the distributed data store system 100 that are introduced by such newly received data are resolved in subsequent data reconciliation operations.

However, if, for a particular key, the data store reconciliation engine 250 determines that the associated timestamp in the recommendation 390(1) is more recent than the associated timestamp in the storage device 236(1), then the data store reconciliation engine 250 updates the storage device 236(1). More precisely, the data store reconciliation engine 250 stores the value and timestamp associated with the key and included in the recommendation 390(1) in the storage device 236(1). Such an operation, overwrites the value and timestamp associated with the key that were previously stored in the storage device 236(1). In this fashion, the data store nodes 132 and the system data reconciliation engine 130 ensures that data is consistently stored across the distributed data store system 100.

Figure 5:
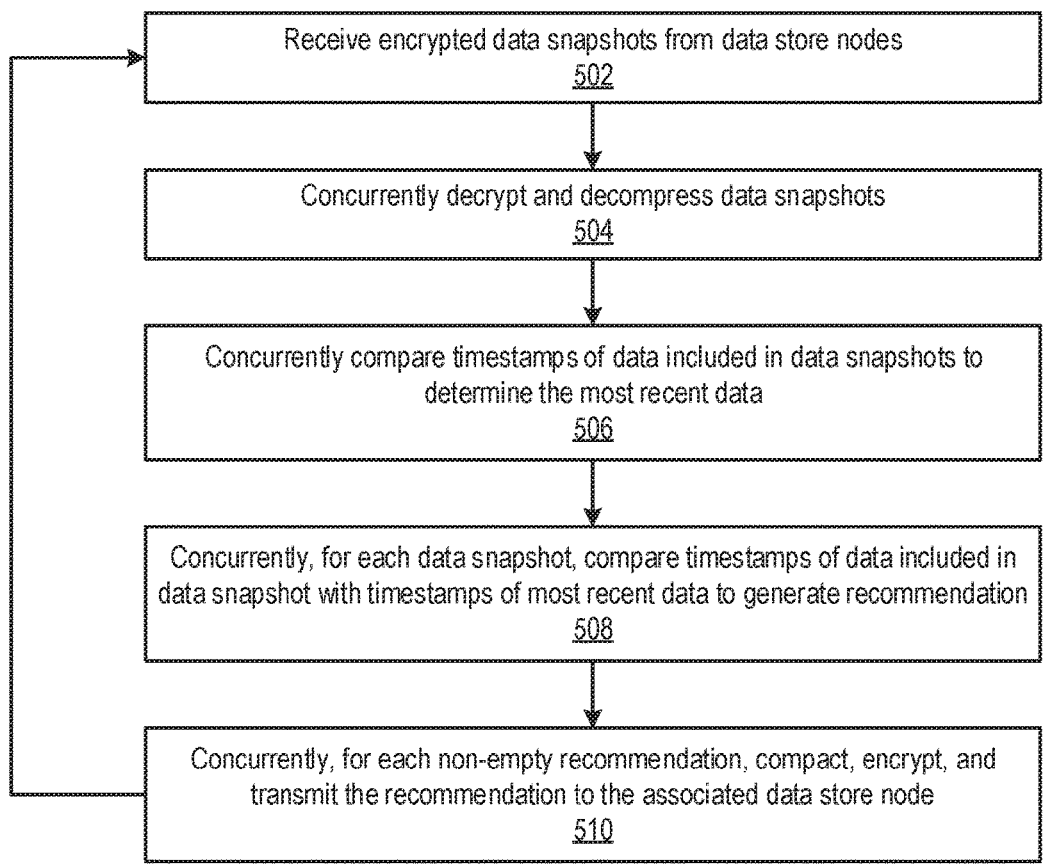
FIG. 5 is a flow diagram of method steps for generating recommendations for data reconciliation in a distributed data store system, according to various embodiments of the present invention.

FIG. 5 is a flow diagram of method steps for generating recommendations for data reconciliation in a distributed data store system, according to various embodiments of the present invention. Although the method steps are described with reference to the systems of FIGS. 1-3, persons skilled in the art will understand that any system configured to implement the method steps, in any order, falls within the scope of the present invention. In general, any number of the processing nodes 142 included in the system data reconciliation engine 140 may be configured to perform any number of the method steps in any combination. Further, each of the processing nodes 142 may perform any portion of the method steps sequentially, concurrently, or any combination thereof with respect to the other processing nodes 142.

As shown, a method 500 begins at step 502, where the system data reconciliation engine 140 receives the data snapshots 380 from the data store nodes 132. Any number of the processing nodes 142 included in the system data reconciliation engine 140 may each receive any number of the data snapshots 380. For example, in some embodiments, a single processing node 142 may receive all the data snapshots 380 and then distribute the data snapshots 380 to the remaining processing nodes 142 for processing. In other embodiments, multiple processing nodes 142 may each receive a different subset of the data snapshots 380. At step 504, the system data reconciliation engine 140 concurrently decrypts and decompresses the data snapshots 380, At step 506, the system data reconciliation engine 140 compares the timestamps of the timestamped data included in the data snapshots 380 to identify the most recent timestamped data. The system data reconciliation engine 140 may perform the comparisons in any technically feasible fashion and at any granularity that is consistent with the data snapshots 380. For example, in some embodiments, the distributed data store system 100 may implement a key-value data storage paradigm in which values are stored and retrieved via unique keys. Each key may be associated with any amount of memory and may be individually timestamped. In such a key-value implementation, the system data reconciliation engine 140 may individually compare the timestamps associated with each key across all the data snapshots 380 to determine, for each key, the most recent timestamp and corresponding value.

At step 508, for each of the data snapshots 380, the system data reconciliation engine 140 compares the timestamps of the timestamped data included in the data snapshot 380 and the timestamps of the most recent timestamped data to identify inconsistencies. In particular, for each of the data snapshots 380, if the system data reconciliation engine 140 determines that any of the most recent timestamped data is more recent than the timestamped data included in the data snapshot 380, then the system data reconciliation engine 140 generates the associated recommendation 390. To minimize the size of each of the recommendations 390, the system data reconciliation engine 140 includes only timestamped data that is more recent than the timestamped data included in the associated data snapshot 380. By contrast, if the system data reconciliation engine 140 determines that all the timestamped data included in a particular data snapshot 380 is consistent with the most recent timestamped data, then the system data reconciliation engine 140 does not generate the associated recommendation 390.

Notably, each of the data snapshots 380 is associated with one of the data store nodes 132 and, therefore, each of the recommendations 390 is associated with one of the data store nodes 132. At step 510, for each of recommendations 390, the system data reconciliation engine 140 compacts, encrypts, and transmits the recommendation 390 to the associated data store node 132. In alternate embodiments, if the size of a particular recommendation 390 is smaller than a predetermined threshold, the system data reconciliation engine 140 may transmit the recommendation 390 without compacting the recommendation 290. The data store nodes 132 may then process the recommendations 390 in any technically feasible fashion that increases the consistency of the timestamped data stored across the distributed data store system 100.

In sum, the disclosed techniques may be used to efficiently perform data reconciliation in a distributed data store system. The distributed data store system includes multiple data store clusters, and each data store cluster includes data store nodes that read data from and write data to associated storage devices. In operation, as each data store node receives data from a client, the data store node timestamps the data and stores the timestamped data in the associated storage device. Upon receiving a data reconciliation trigger, each data store node creates a data snapshot of the time-stamped data currently stored in the associated storage device. Each data store node compacts, compresses, and encrypts the associated data snapshot and then securely transmits the encrypted data snapshot to a system data processing engine.

The system data reconciliation engine receives the encrypted data snapshots from all the data store nodes included in the distributed data store. Processing nodes included in the system data reconciliation engine concurrently process the encrypted data snapshots. More specifically, the processing nodes work together to decrypt, decompress, and analyze the encrypted data snapshots to determine the most recent timestamped data. After determining the most recent timestamped data, for each data snapshot, the system data reconciliation engine creates a recommendation that includes the most recent timestamped data that is not included in the data snapshot. For each recommendation, the system data processing engine compresses and encrypts the recommendation and then securely transmits the encrypted recommendation to the data store node that provided the data snapshot associated with the recommendation.

Each data store node that receives a recommendation compares the timestamped data included in the recommendation to the timestamped data stored in the associated storage device. If the timestamp of any particular portion of data included in the recommendation is more recent than the corresponding portion of data stored in the associated storage device, then the data store node updates the portion of stored data. More specifically, the data store node replaces stale data included in the associated storage device with the up-to-date data included in the recommendation. By contrast, if the timestamp of any particular portion of data included in the recommendation is not more recent than the corresponding stored data, then the node discards the portion of data included in the recommendation. In this fashion, the data store nodes may continue respond to client requests while the system data reconciliation engine is performing reconciliation operations without jeopardizing any newly received client data.

Advantageously, because the distributed data store system offloads many of the data reconciliation operations from the data store clusters to the system data reconciliation engine, the overall performance of the distributed data store system is optimized. More precisely, since the portion of the data reconciliation process that consumes data store node resources (e.g., memory bandwidth, memory, processing capability associated with the data store nodes) is minimized, the amount of data store node resources available to process client requests is maximized. Consequently, the volume of data that the distributed data store system may access with acceptable response times may dramatically exceed the volume of data that a conventional distributed data store system can typically access with acceptable response times.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
comparing, by a processing node executing a system data reconciliation engine in response to a request to perform data reconciliation from a data store reconciliation engine included in a first data store node included in a plurality of data store nodes, a first timestamp associated with a first value that is received from the first data store node to a second timestamp associated with a second value that is received from a second data store node also included in the plurality of data store nodes, wherein the first data store node stores client data received from a first set of client devices in a first geographic region, the second data store node stores client data received from a second set of client devices in a second geographic region, and the processing node, the first data store node, and the second data store node are located in separate geographic regions, wherein each data store node included in the plurality of data store nodes includes a corresponding data store reconciliation engine, wherein the system data reconciliation engine is a different application from and performs different operations than the corresponding data store reconciliation engines, wherein the system data reconciliation engine is configured to perform system data reconciliation on data stored by the plurality of data store nodes and provide recommendations to the plurality of data store nodes, and wherein the corresponding data store reconciliation engines are configured to respond to the recommendations from the system data reconciliation engine and perform data reconciliation operations for data stored at a corresponding data store node;
determining that the second timestamp indicates a more recent time than the first timestamp;
comparing, by the processing node, the second value to the first value;
determining that the second value is different than the first value; and
transmitting a first recommendation that includes the second value to the data store reconciliation engine included in the first data store node.

2. The computer-implemented method of claim 1, further comprising performing at least one of a decryption operation or a decompression operation on first processed data to generate the first value.

3. The computer-implemented method of claim 1, further comprising performing at least one of an encryption operation or a compression operation on the second value to generate the first recommendation.

4. The computer-implemented method of claim 1, further comprising:
comparing a third timestamp associated with a third value that is received from the first data store node to a fourth timestamp associated with a fourth value that is received from the second data store node;
determining that the third timestamp indicates a more recent time than the fourth timestamp; and
transmitting a second recommendation that includes the third value to the second data store node.

5. The computer-implemented method of claim 4, wherein operations related to comparing the first timestamp and comparing the third timestamp occur at least partially in parallel.

6. The computer-implemented method of claim 4, wherein operations related to transmitting the first recommendation and transmitting the second recommendation occur at least partially in parallel.

7. The computer-implemented method of claim 1, wherein the first recommendation further includes the second timestamp.

8. The computer-implemented method of claim 1, wherein the first timestamp is generated based on a centralized clock service.

9. One or more non-transitory computer-readable storage media including instructions that, when executed by one or more processors, cause the one or more processors to perform the steps of:
storing a first value and a first timestamp at a first location in a first data store node included in a plurality of data store nodes;
generating a data snapshot that includes the first value and the first timestamp;
transmitting, via a data store reconciliation engine included in the first data store node, the data snapshot to a processing node executing a system data reconciliation engine and, in response, receiving a recommendation from the processing node that includes a second value and a second timestamp, wherein the processing node:
in response to receiving a request to perform data reconciliation that includes the data snapshot from the data store reconciliation engine included in the first data store node, compares the first timestamp to the second timestamp associated with the second value that is received from a second data store node also included in the plurality of data store nodes, wherein the first data store node stores client data received from a first set of client devices in a first geographic region, the second data store node stores client data received from a second set of client devices in a second geographic region, and the processing node, the first data store node, and the second data store node are located in separate geographic regions, wherein each data store node included in the plurality of data store nodes includes a corresponding data store reconciliation engine, wherein the system data reconciliation engine is a different application from and performs different operations than the corresponding data store reconciliation engines, wherein the system data reconciliation engine is configured to perform system data reconciliation on data stored by the plurality of data store nodes and provide recommendations to the plurality of data store nodes, and wherein the corresponding data store reconciliation engines are configured to respond to the recommendations from the system data reconciliation engine and perform data reconciliation operations for data stored at a corresponding data store node,
determines that the second timestamp indicates a more recent time than the first timestamp,
compares the second value to the first value,
determines that the second value is different than the first value, and transmits the recommendation to the data store reconciliation engine included in the first data store node;
determining that the second timestamp included in the recommendation indicates a more recent time than the first timestamp; and
storing the second value included in the recommendation and the second timestamp at the first location.

10. The one or more non-transitory computer-readable storage media of claim 9, wherein the first timestamp is associated with the first value, the second timestamp is associated with the second value, and both the first value and the second value are associated with a first key.

11. The one or more non-transitory computer-readable storage media of claim 9, wherein the recommendation also includes a third value and a third timestamp, and further comprising:
comparing a fourth timestamp that is associated with a fourth value to the third timestamp, wherein the fourth value is stored at a second location in the first data store node, and both the third value and the fourth value are associated with a second key; and
if the third timestamp indicates a more recent time than the fourth timestamp, then storing the third value at the second location, or
if the third timestamp does not indicate a more recent time than the fourth timestamp, then discarding the third value.

12. The one or more non-transitory computer-readable storage media of claim 9, further comprising generating the first timestamp based on a centralized clock service.

13. The one or more non-transitory computer-readable storage media of claim 9, wherein generating the data snapshot comprises executing at least one of a compaction operation, an encryption operation, or a compression operation on the first value and the first timestamp.

14. The one or more non-transitory computer-implemented media of claim 9, further comprising executing at least one of a decryption operation or a decompression operation on the recommendation to read the second timestamp.

15. The one or more non-transitory computer-implemented media of claim 9, wherein the transmitting the data snapshot comprises:
generating a plurality of chunks based on the first data snapshot; and
transmitting the plurality of chunks to the processing node.

16. The one or more non-transitory computer-implemented media of claim 9, wherein the transmitting the data snapshot comprises:
generating a first chunk and a second chunk based on the first data snapshot;
executing at least one of a compaction operation, a compression operation, or an encryption operation on the first chunk to generate a first processed chunk;
executing at least one of the compaction operation, the compression operation or the encryption operation on the second chunk to generate a second processed chunk; and
transmitting the first processed chunk and the second processed chunk to the processing node for data reconciliation operations.

17. A system, comprising:
a processing node that is executing a system data reconciliation node and that includes a first processor, wherein the first processor executes first instructions to perform the steps of:
receiving data snapshots from a plurality of data store nodes, wherein each data snapshot includes a value and a corresponding timestamp;
determining, in response to a request to perform data reconciliation from a data store data reconciliation engine included in one data store node included in the plurality of data store nodes, that a second timestamp included in a data snapshot received from the one data store node indicates a more recent time than a first timestamp included in a data snapshot received from another data store node also included in the plurality of data store nodes, wherein the one data store node stores client data received from a first set of client devices in a first geographic region, the another data store node stores client data received from a second set of client devices in a second geographic region, and the processing node, the one data store node, and the another data store node are located in separate geographic regions, wherein each data store node included in the plurality of data store nodes includes a corresponding data store reconciliation engine, wherein the system data reconciliation engine is a different application from and performs different operations than the corresponding data store reconciliation engines, wherein the system data reconciliation engine is configured to perform system data reconciliation on data stored by the plurality of data store nodes and provide recommendations to the plurality of data store nodes, and wherein the corresponding data store reconciliation engines are configured to respond to the recommendations from the system data reconciliation engine and perform data reconciliation operations for data stored at a corresponding data store node;
comparing a second value included in the data snapshot received from the one data store node to a first value included in the data snapshot received from the another data store node;
determining that the second value is different than the first value;
generating one or more recommendations, wherein each of the recommendations is associated with a different data store node that is included in the plurality of data store nodes; and
for each of the one or more recommendations, transmitting the recommendation to a corresponding data store reconciliation engine included in the data store node that is associated with the recommendation; and
a first data store node that includes a second processor, wherein the second processor executes second instructions associated with a corresponding data store reconciliation engine to perform the steps of:
generating a first data snapshot and transmitting the first data snapshot to the processing node; and
resolving inconsistencies between the first data store node and a second data store node based on a first recommendation received from the processing node.

18. The system of claim 17, wherein generating the one or more recommendations comprises including the second value and the second timestamp in the first recommendation.

19. The system of claim 17, wherein the first data store node is included in a first cluster that is located in the first geographic region, and the second data store node is included in a second cluster that is located in the second geographic region.

20. The computer-implemented method of claim 1, wherein the first data store node and the second data store node are available for processing client data requests from client devices while the processing node executing the system data reconciliation engine performs the steps of comparing the first timestamp to the second timestamp, determining that the second timestamp indicates the more recent time than the first timestamp, comparing the second value to the first value, determining that the second value is different than the first value, and transmitting the first recommendation.

* * * * *